(12) United States Patent
Kubo

(10) Patent No.: US 9,047,024 B2
(45) Date of Patent: Jun. 2, 2015

(54) RECORDING MEDIUM RECORDING REPLACEMENT PRINTING CONTROL PROGRAM FOR PERFORMING REPLACEMENT ON ORIGINAL DATA AND CAUSING PRINTING MACHINE TO PRINT BASED ON DATA OBTAINED BY REPLACEMENT, REPLACEMENT PRINTING CONTROL APPARATUS, AND REPLACEMENT PRINTING CONTROL METHOD

(71) Applicant: RISO KAGAKU CORPORATION, Tokyo (JP)

(72) Inventor: Takashi Kubo, Ibaraki (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 14/082,568

(22) Filed: Nov. 18, 2013

(65) Prior Publication Data

US 2014/0153044 A1 Jun. 5, 2014

(30) Foreign Application Priority Data

Dec. 4, 2012 (JP) ................................. 2012-265038

(51) Int. Cl.
*G06F 3/12* (2006.01)
(52) U.S. Cl.
CPC ............ *G06F 3/1205* (2013.01); *G06F 3/1219* (2013.01); *G06F 3/1254* (2013.01); *G06F 3/1265* (2013.01); *G06F 3/1288* (2013.01)

(58) Field of Classification Search
CPC ... G06F 3/1239; G06F 3/1253; G06F 3/1261; G06K 15/1878; G06K 15/0178
USPC ....................... 358/1.13, 1.9, 1.15; 399/27, 82
See application file for complete search history.

(56) References Cited

U.S. PATENT DOCUMENTS

2010/0177352 A1* 7/2010 Anno ........................... 358/1.15
2011/0242574 A1* 10/2011 Soriano et al. ............... 358/1.14

FOREIGN PATENT DOCUMENTS

JP 2010147956 7/2010

* cited by examiner

*Primary Examiner* — Jacky X Zheng
(74) *Attorney, Agent, or Firm* — Nath, Goldberg & Meyer; Jerald L. Meyer; Tiffany A. Johnson

(57) ABSTRACT

A computer-readable storage medium stores a program for causing a computer to execute a process. The process includes: a data generation step of, in response to a command to perform replacement printing of original data, generating, based on the original data, print target data to be printed on a sheet and save data to be transmitted to a data saving server connected via a network; a save-data transmission step of transmitting the save data generated in the data generation step to the data saving server, and acquiring address information indicating a save location of the save data saved in the data saving server; and a data print step of generating print data by adding the address information acquired in the save-data transmission step to the print target data and driving a printing machine to print the print data as generated.

6 Claims, 11 Drawing Sheets

FIG. 5

| UPLOAD CHECK | | | | | | | | | | |
|---|---|---|---|---|---|---|---|---|---|---|
| GENERAL | SHARING | PORT | ADVANCED SETTINGS | COLOR MANAGEMENT | SECURITY | DEVICE SETTINGS | ENVIRONMENT | DATA SAVING SERVER |

☑ UPLOAD SAVE DATA TO DATA SAVING SERVER — 14c1

ROUTE ADDRESS: http://www.riso.co.jp/DocumentService / — 14c2

USER SETTINGS:
○ USE PRESET USER INFORMATION
● USE NEW USER INFORMATION
   USER NAME : RISO_User
   PASSWORD : **********
— 14c3

SUBFOLDER CREATION RULES
● AUTOMATIC ALLOCATION BY SERVER (RECOMMENDED)
○ PREFIX + SERIAL NUMBER
   PREFIX TEXT : RISO
— 14c4

[OK] [CANCEL] [APPLY]

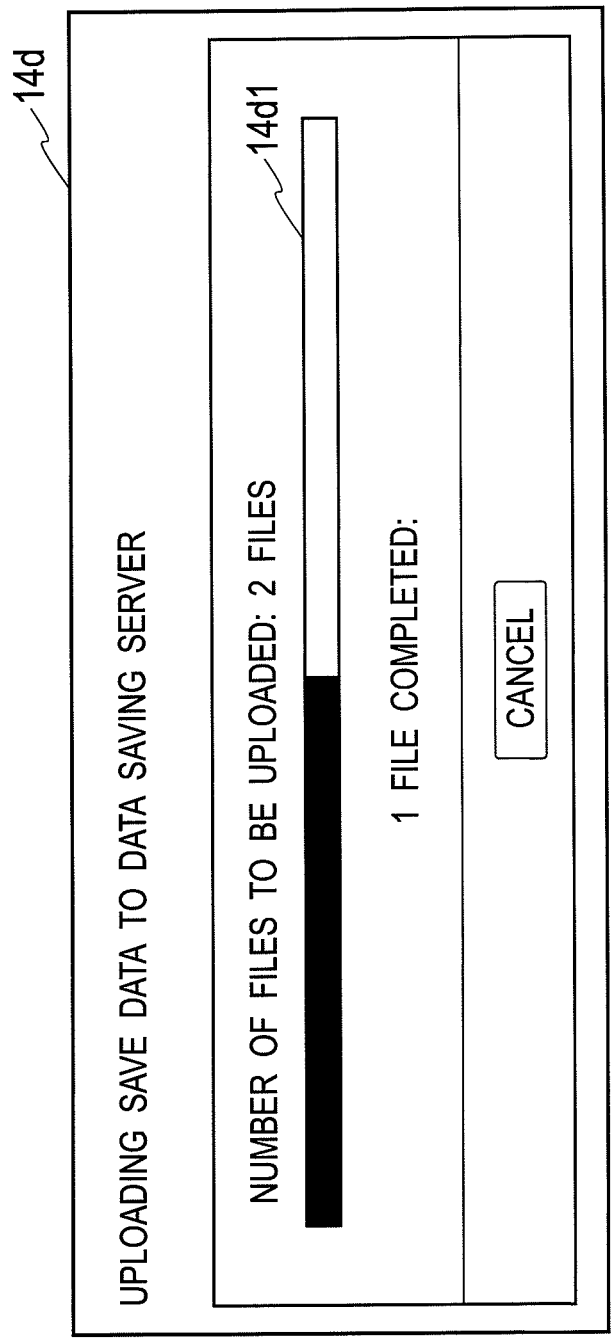

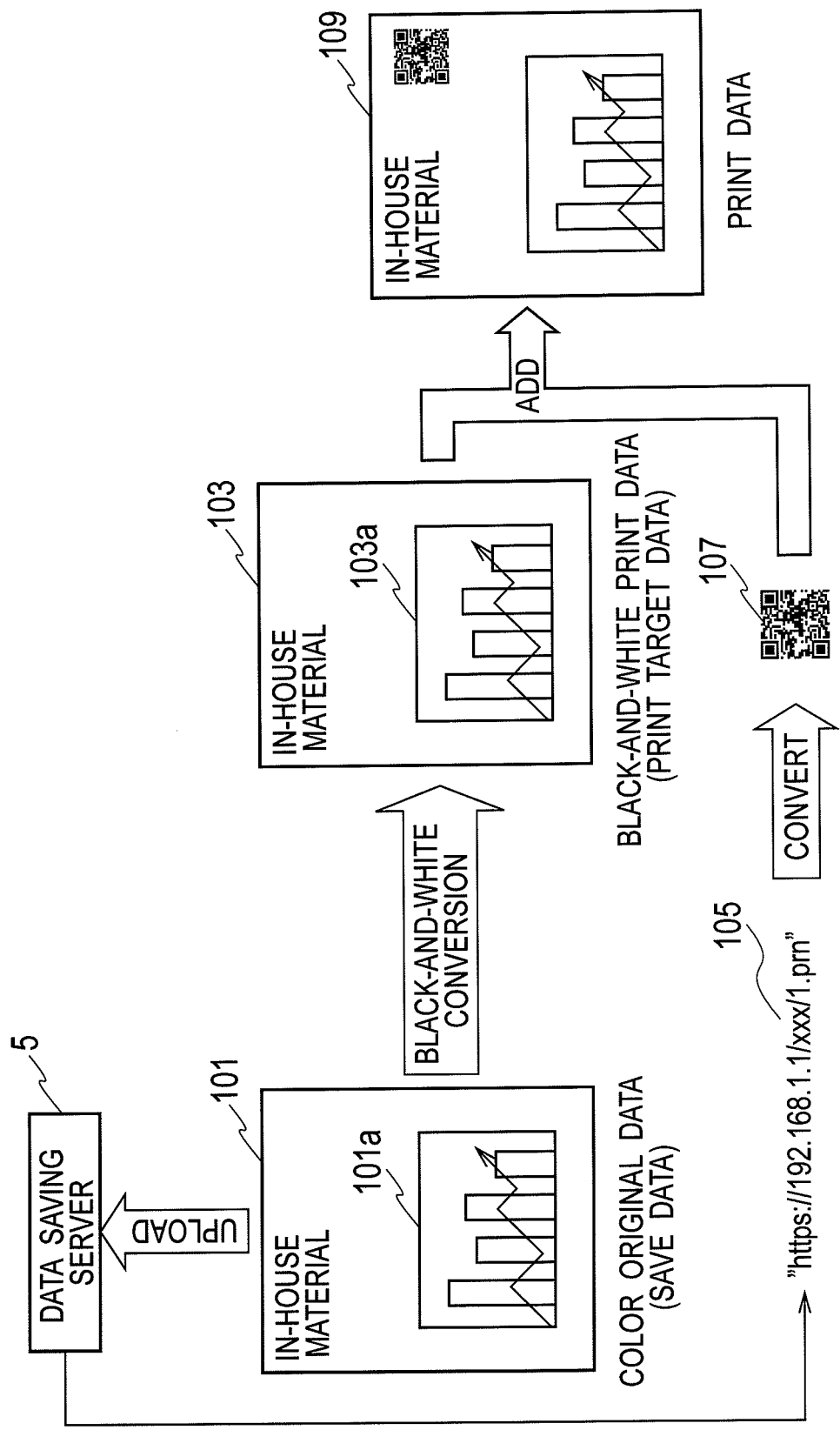

RECORDING MEDIUM RECORDING REPLACEMENT PRINTING CONTROL PROGRAM FOR PERFORMING REPLACEMENT ON ORIGINAL DATA AND CAUSING PRINTING MACHINE TO PRINT BASED ON DATA OBTAINED BY REPLACEMENT, REPLACEMENT PRINTING CONTROL APPARATUS, AND REPLACEMENT PRINTING CONTROL METHOD

CROSS REFERENCE TO RELATED APPLICATION

This application is based upon and claims the benefit of priority from the prior Japanese Patent Application No. 2012-265038, filed on Dec. 4, 2012, the entire contents of which are incorporated herein by reference.

BACKGROUND

1. Technical Field

The present invention relates to a recording medium recording a replacement printing control program for performing replacement on original data and causing a printing machine to print based on data obtained by the replacement, and also to a replacement printing control apparatus and a replacement printing control method.

2. Related Art

Japanese Patent Application Publication No. 2010-147956 proposes a printing machine configured to read an image, on an original, containing barcode information and to print based on image data included in the barcode information if identification information included in the barcode information indicates a print process.

SUMMARY

In recent years, with the widespread use of color printers, color multifunctional machines and the like, more and more color-printed handouts are distributed in meetings, lectures, and the like in addition to or instead of handouts printed in black and white (monochrome). However, color printing generally costs several times higher than black-and-white printing. For this reason, handout preparers such as organizers who prepare and distribute handouts demand to reduce costs of printing the handouts by avoiding color printing as much as possible.

On the other hand, some handout recipients to which handouts are distributed demand to see the handouts printed in color.

When an entire material for a meeting or lecture contains an enormous number of pages, such huge material is not necessarily used entirely in the meeting or lecture or all the attendants are not necessarily interested in every page of the material. Thus, from a printing cost perspective, handout preparers demand to, instead of printing details/material data of details of papers, materials having many pages and the like, prepare only proceedings or the like by printing just summary/outline data of the summary or outline of the papers and the like, and distribute the proceedings as handouts.

On the other hand, some handout recipients demand to see not only the summary or outline, but also the details.

In the technique described in Japanese Patent Application Publication No. 2010-147956, the barcode itself contains original data such as document data or image data to be printed. For this reason, when the data size of the original data to be included in the barcode is large, the barcode cannot represent the original data. Especially in a case where the original data is in color, the data size tends to be large, and therefore the original data cannot be represented by the barcode in many cases.

For this reason, handout prepares sometimes cannot provide materials that meet the demands of handout recipients while reducing the costs of printing the handouts.

The present invention has an objective of providing a recording medium recording a replacement printing control program capable of, irrespective of the data size, reducing costs of printing handouts and providing materials that meet demands, as well as providing a replacement printing control apparatus and a replacement printing control method.

A computer-readable storage medium storing a program for causing a computer to execute a process in accordance with some embodiments includes: a data generation step of, in response to a command to perform replacement printing of original data, generating, based on the original data, print target data to be printed on a sheet and save data to be transmitted to a data saving server connected via a network; a save-data transmission step of transmitting the save data generated in the data generation step to the data saving server, and acquiring address information indicating a save location of the save data saved in the data saving server; and a data print step of generating print data by adding the address information acquired in the save-data transmission step to the print target data and driving a printing machine to print the print data as generated.

A replacement printing control method in accordance with some embodiments includes: a data generation step of, by a processor, in response to a command to perform replacement printing of original data, generating, based on the original data, print target data to be printed on a sheet and save data to be transmitted to a data saving server connected via a network; a save-data transmission step of, by the processor, transmitting the save data generated in the data generation step to the data saving server, and acquiring address information indicating a save location of the save data saved in the data saving server; and a data print step of, by the processor, generating print data by adding the address information acquired in the save-data transmission step to the print target data and driving a printing machine to print the print data as generated.

According to the above configuration, costs of printing handouts can be reduced, and at the same time, materials that meet demands can be provided. Specifically, a handout preparer side can reduce costs of printing a handout as much as possible. On the other hand, a handout recipient side can certainly obtain save data which is related to the handout but is not printed on the handout by downloading it from the data saving server based on the address information printed on the handout.

The original data may contain color object data, and the data generation step may include, if the command to perform the replacement printing includes black-and-white conversion of the original data, generating, as the print target data, black-and-white data of the original data by performing black-and-white conversion on the color object data, and generating the original data as the save data.

According to the above configuration, a handout preparer side can reduce costs of printing a handout as much as possible by not performing color printing. A handout recipient side is not provided with printed color original data, but can certainly obtain the color original data by downloading it from the data saving server based on the address information printed on the handout.

The original data may contain detailed data indicating details and outline data indicating an outline of the detailed data, and the data generation step may includes, if the command to perform the replacement printing includes omission of details of the original data, generating the outline data of the original data as the print target data and generating the detailed data of the original data as the save data.

According to the above configuration, a handout preparer side can reduce costs of printing a handout as much as possible by not printing the detailed data. A handout recipient side is not provided with the detailed data in a printed form, but can certainly obtain the detailed data by downloading it from the data saving server based on the address information printed on the handout.

The data generation step may include, if the command to perform the replacement printing includes imposition of the original data, generating imposition data as the print target data by performing imposition processing on the original data and generating the original data as the save data.

According to the above configuration, a handout preparer side can reduce cost for printing a handout since the handout is printed with imposition (N-up printing), and at the same time, a handout recipient side can certainly obtain original data which is not printed with imposition (N-up printing) by downloading it from the data saving server based on the address information printed on the handout.

A replacement printing control apparatus in accordance with some embodiments includes: a processor; a computer-readable storage medium storing a program executed by the processor; a data generation unit implemented when the processor executes the program and configured to, in response to a command to perform replacement printing of original data, generate, based on the original data, print target data to be printed on a sheet and save data to be transmitted to a data saving server connected via a network; a save-data transmission unit implemented when the processor executes the program and configured to transmit the save data generated by the data generation unit to the data saving server and to acquire address information indicating a save location of the save data saved in the data saving server; and a data print unit implemented when the processor executes the program and configured to generate print data by adding the address information acquired by the save-data transmission unit to the print target data and to drive a printing machine to print the print data as generated.

Here, replacement printing refers to a printing method of performing replacement on original data and causing a printing machine to print based on the data obtained by the replacement. The replacement printing includes, for example, replacement printing in a black-and-white conversion print mode of converting original data into black-and-white data, replacement printing in a detailed material omission mode of printing only outline data on the first page or the like, and replacement printing in an N-up printing mode of printing multiple pages of original data on a single sheet, namely, N-up printing (imposition printing).

According to the above configuration, costs of printing handouts can be reduced, and at the same time, materials that meet demands can be provided. Specifically, a handout preparer side can reduce costs of printing a handout as much as possible. On the other hand, a handout recipient side can certainly obtain save data which is related to the handout but is not printed on the handout by downloading it from the data saving server based on the address information printed on the handout.

BRIEF DESCRIPTION OF DRAWINGS

FIG. 5 shows an example of an upload check window displayed on the display unit of the client computer when original data (save data) generated by execution of the replacement printing control program according to the first embodiment of the present invention is uploaded to a data saving server.

FIG. 6 shows an example of an uploading window displayed on the display unit while color original data (save data) generated by execution of the replacement printing control program according to the first embodiment of the present invention is being uploaded to the data saving server.

FIG. 7 is a diagram schematically showing the replacement printing control method executed by the replacement printing control program according to the first embodiment of the present invention.

DETAILED DESCRIPTION

Figure 1:
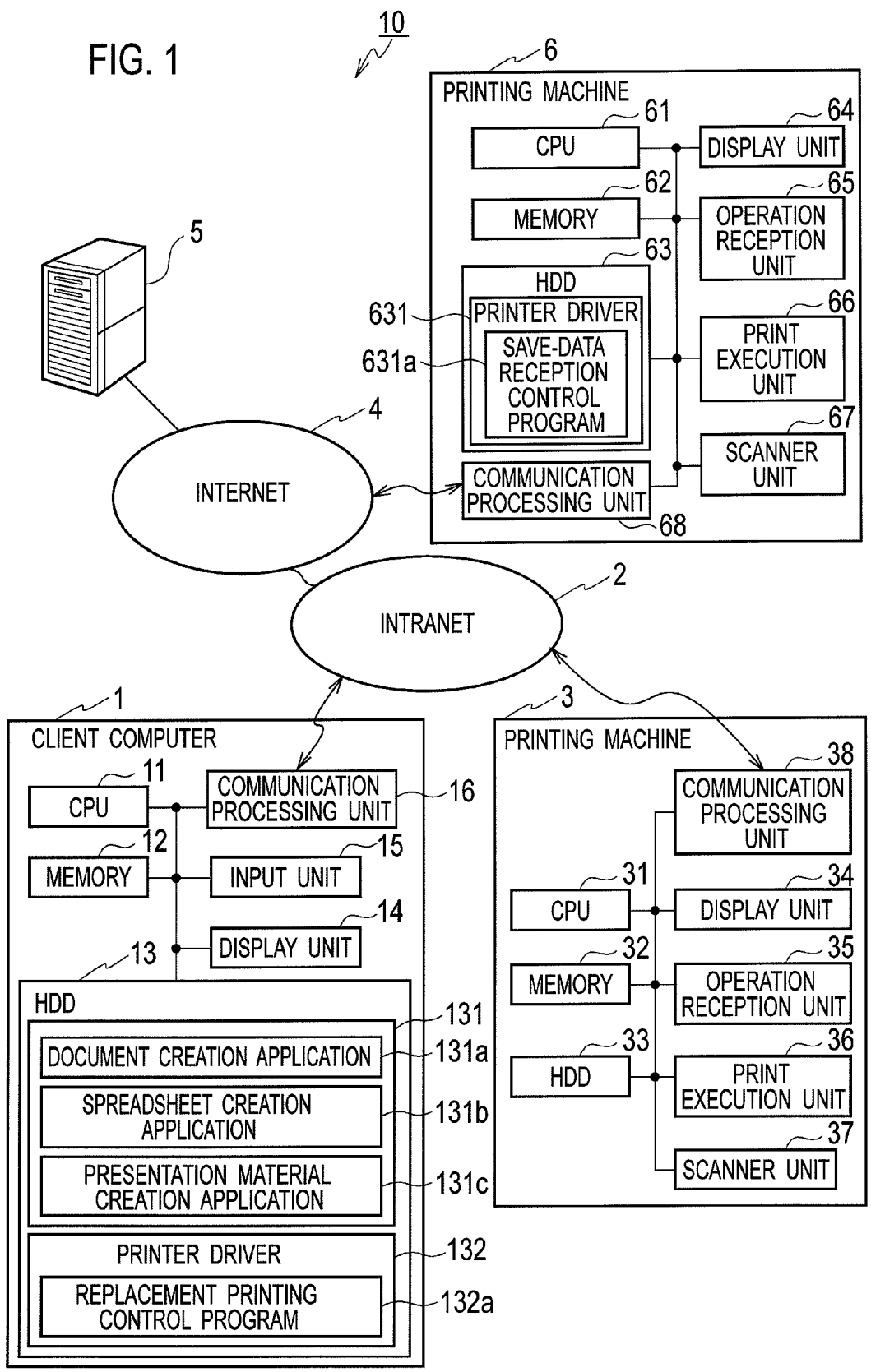
FIG. 1 is a diagram showing the configuration of a printing system including a client computer functioning as a replacement printing control apparatus by executing a replacement printing control program according to a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

With reference to the drawings, descriptions are given in detail below of replacement printing control programs according to first to third embodiments of the present invention.

In a fourth embodiment of the present invention, a description is given of a save-data reception control program for downloading save data saved by execution of the replacement printing control programs according to first to third embodiments of the present invention. The replacement printing control program and the save-data reception control program are collectively referred to as print distribution programs.

First Embodiment

FIG. 1 is a diagram showing the configuration of a printing system including a client computer functioning as a replacement printing control apparatus by executing the replacement printing control program according to the first embodiment of the present invention.

A printing system 10 includes a client computer 1, a printing machine 3, a printing machine 6 functioning as a save-data reception control apparatus by executing the save-data reception control program, and a data saving server 5.

The client computer 1 is a computer device configured to execute the replacement printing control programs according to the embodiments of the present invention. The client computer 1 is connected to the printing machine 3 via an intranet 2, and is also connected to the data saving server 5 and the printing machine 6 via the intranet 2 and an Internet 4. Note that the configuration of the printing machine 6 will be described in detail later in the fourth embodiment of the present invention.

The client computer 1 is similar to a multi-purpose personal computer, and has a CPU (processor) 11 configured to execute various programs, a memory 12, an HDD (computer-readable storage medium which records programs executed by the computer) 13 in which the various programs are recorded, a display unit 14 such as a liquid crystal monitor or the like, an input unit 15 such as a keyboard and a mouse, a communication processing unit 16, such as a LAN interface unit, configured to connect the client computer 1 to the intranet 2, and the like. The HDD 13 may be a solid state drive (SSD) or memory.

The HDD 13 of the client computer 1 stores therein, besides an operation system (OS), various programs for creating original data. Specifically, the HDD 13 stores, for example, application programs (hereinafter referred to simply as applications) 131 such as a document creation application 131a for creating a document file, a spreadsheet creation application 131b for creating a spreadsheet file, and a presentation material creation application 131c for creating a presentation file, as well as a printer driver program (hereinafter referred to simply as a printer driver) 132 for generating a print job having predetermined print settings for a file created by execution of the applications 131 and transmitting the print job to the printing machine 3.

The printer driver 132 of the client computer 1 includes a replacement printing control program 132a according to the first embodiment of the present invention. Specifically, the client computer 1 connected to the printing machine 3 has the replacement printing control program 132a installed therein, and includes the HDD 13 which is a computer-readable storage medium in which computer-executed programs (the replacement printing control program 132a) are recorded.

The CPU 11 implements a data generation unit, a save-data transmission unit, and a data print unit (all of them not shown) by executing the replacement printing control program 132a stored in the HDD 13.

The data generation unit is configured as follows. Specifically, in response to a command to perform replacement printing of original data, the data generation unit generates, based on the original data, print target data to be printed on a sheet, and save data to be transmitted to the data saving server 5 connected to the client computer 1 via networks such as the intranet 2 and the Internet 4.

For example, upon a request that original data including color object data should be printed by replacement involving black-and-white conversion, the data generation unit performs black-and-white conversion on the color object data, thus generates black-and-white data of the original data as the print target data, and also generates the original data as the save data. The color object data mentioned herein refers to color image data represented in color, such as a drawing, a table, and a photograph, or text data represented in color.

The save-data transmission unit is configured to transmit the save data generated by the data generation unit to the data saving server 5, and acquires address information indicating a save location of the save data saved in the data saving server 5.

The data print unit is configured to generate print data by adding the address information acquired by the save-data transmission unit to the print target data, and cause the printing machine 3 to print the print data.

Alternatively, the data print unit may be configured to convert the address information into an address information code having a better scanning recognition rate than the address information, generate print data by adding the address information code to the print target data, and cause the printing machine 3 to print the print data.

The printing machine 3 includes, for example, a CPU 31 configured to control overall operation of the printing machine 3, a memory 32 configured to store, for example, a print job transmitted from each client computer 1, an HDD 33 configured to store, for example, programs executed by the CPU 31, a display unit 34 such as a liquid crystal monitor, an operation reception unit 35 provided with various buttons for operating the printing machine 3, a print execution unit 36 configured to convey a sheet according to various operational commands from the CPU 31 and perform various types of printing by reading, for example, a print job stored in the memory 32, a scanner unit 37, and a communication processing unit 38, such as a LAN interface unit, configured to connect the printing machine 3 to the intranet 2. The HDD 33, too, may be a solid state drive (SSD) or memory.

Next, with reference to several drawings, a description is given of a replacement printing control method executed by the replacement printing control program 132a stored in the HDD 13, which is executed by the CPU 11 of the client computer 1.

Figure 2:
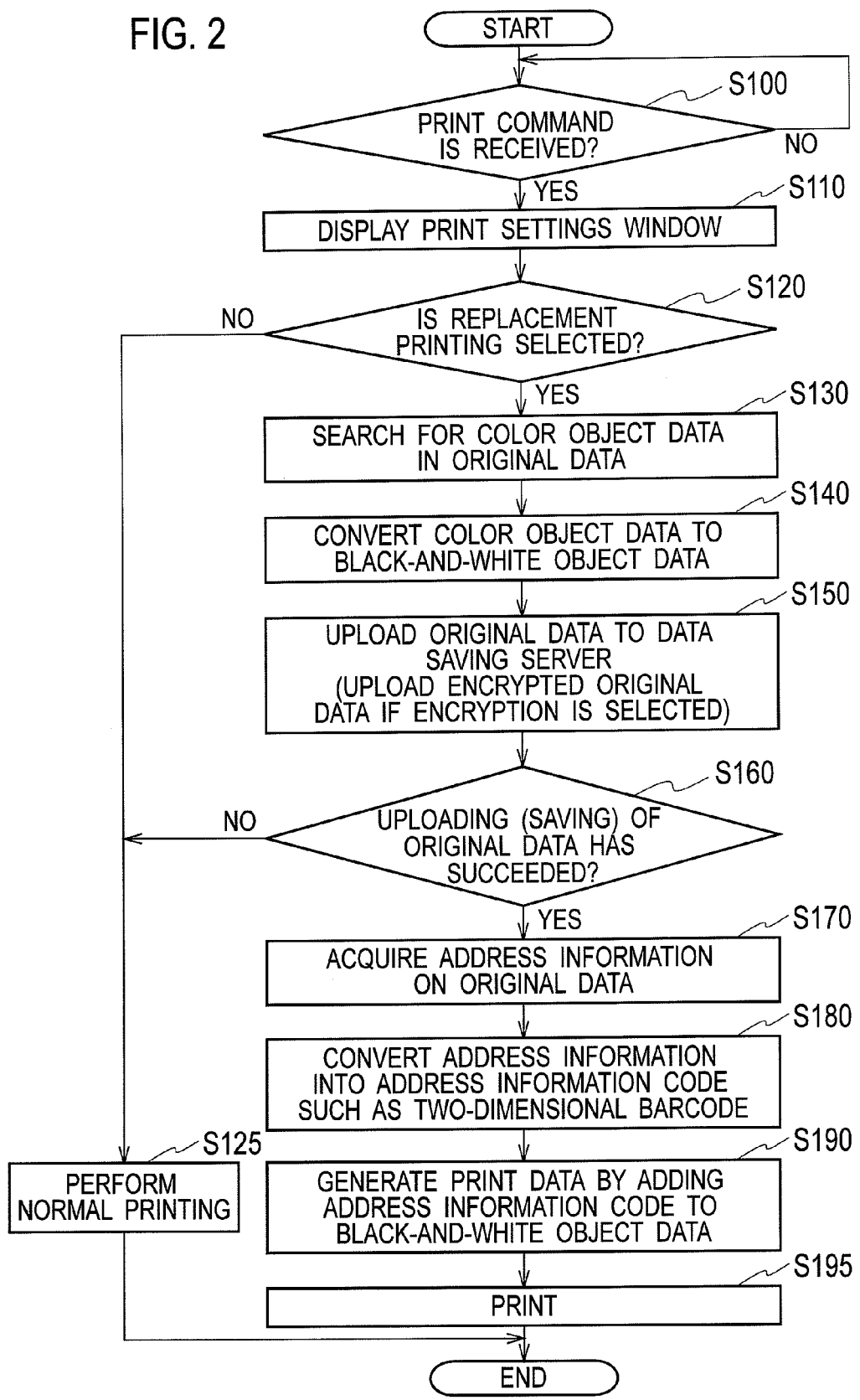
FIG. 2 is a flowchart showing a replacement printing control method executed by the replacement printing control program according to the first embodiment of the present invention.

FIG. 2 is a flowchart showing the replacement printing control method executed by the replacement printing control program according to the first embodiment of the present invention. Assume a case where the client computer 1 generates original data which includes color object data by executing the application 131 such as the document creation application 131a, the spreadsheet creation application 131b, or the presentation material creation application 131c.

As shown in FIG. 2, after the original data is generated, upon receipt of a command to print the original data (Step S100: YES), the data generation unit implemented by the CPU 11 of the client computer 1 executes the replacement printing control program 132a in the printer driver 132, and displays a print settings window 14a, like the one shown in FIG. 3, on the display unit 14 (Step S110).

Then, based on user operation, the data generation unit of the CPU 11 sets the number of print executions and the like, and judges whether or not to perform replacement printing (Step S120).

Figure 3:
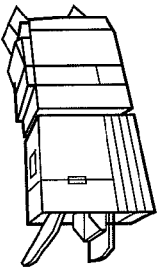
FIG. 3 is a diagram showing an example of a print settings window displayed on a display unit by processing in Step S110 executed by the replacement printing control program according to the first embodiment of the present invention.

FIG. 3 is a diagram showing an example of the print settings window 14a displayed on the display unit 14 by the processing in Step S110 executed by the replacement printing control program 132a according to the first embodiment of the present invention.

As shown in FIG. 3, the print settings window 14a has a general settings field 14a3 for making settings on general print setting items, a replacement printing selecting field 14a1 for selecting whether or not to perform replacement printing, and a replacement printing advanced settings button 14a2 for displaying a replacement printing settings window 14b on which advanced settings for replacement printing are made, and the like. The general settings field 14a3 includes a print execution number setting field for setting the number of copies to print, and fields for which selection is made by checking or not checking their boxes, namely, a programmed printing selecting field, a skip-black-pages selecting field, a successive sheet discharge selecting field, a watermark selecting field, a page number and data print selecting field, and a PIN selecting field. When the replacement printing selecting field 14a1 is not selected, the original data generated by the application 131 is normally printed according to the print settings set in other fields in the print settings window 14a.

Figure 4:
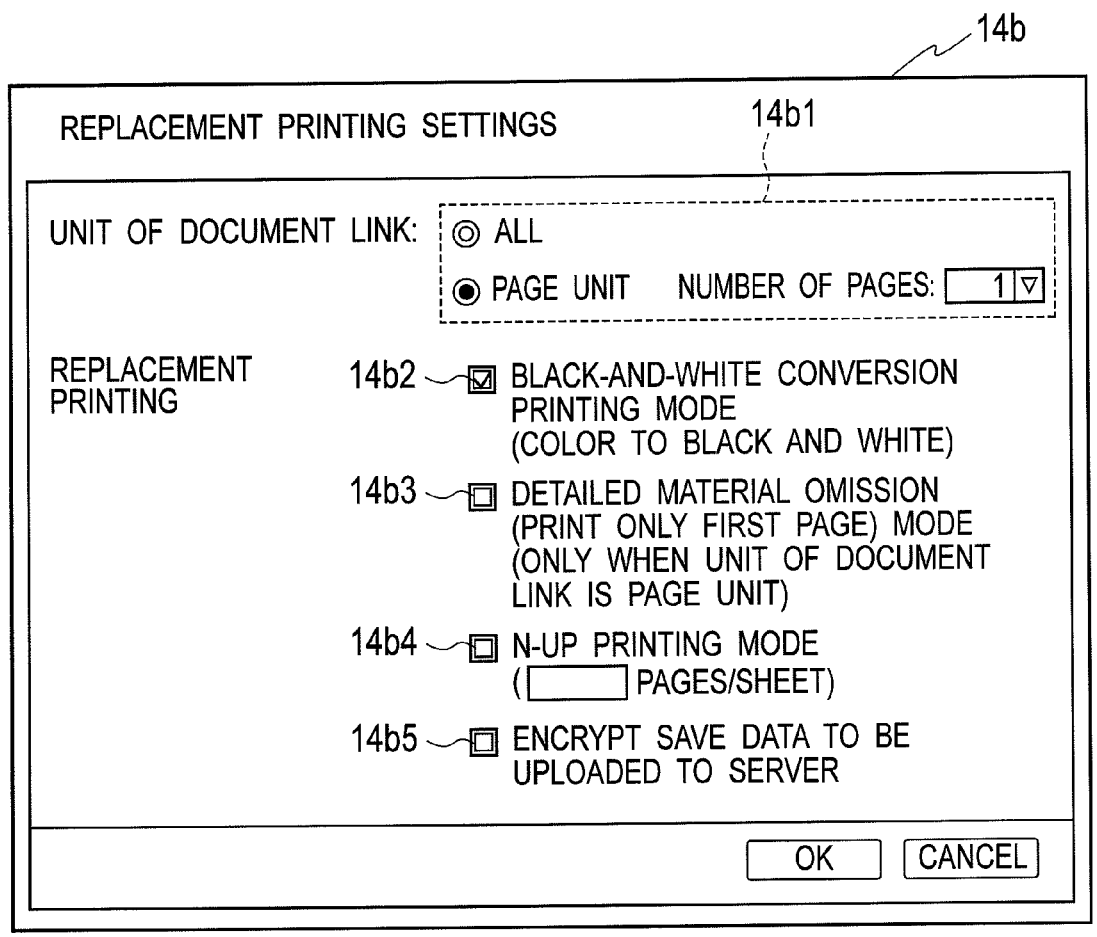
FIG. 4 is a diagram showing an example of a replacement printing settings window displayed on the display unit when a replacement printing advanced settings button is selected on the print settings window displayed on the display unit by execution of the replacement printing control program according to the first embodiment of the present invention.

FIG. 4 is a diagram showing an example of the replacement printing settings window 14b displayed on the display unit 14 when the replacement printing advanced settings button 14a2 is selected on the print settings window 14a shown in FIG. 3.

The replacement printing settings window 14b shown in FIG. 4 is a window displayed on the display unit 14 when the replacement printing advanced settings button 14a2 is selected with the replacement printing selection field 14a1 being selected on the print settings window 14a shown in FIG. 3.

As shown in FIG. 4, the replacement printing settings window 14b has: a document link unit selecting field 14b1 for selecting a document link unit from either "all" or "page," a black-and-white conversion print mode selecting field 14b2 for selecting a black-and-white conversion print mode in which original data is converted to black-and-white data; a detailed material omission mode selecting field 14b3 for selecting a detailed material omission mode in which detailed data on pages from the second page are not printed but saved in the data saving server 5, and outline data such as the first page is printed; an N-up print mode selecting field 14b4 for selecting N-up print (imposition print) in which multiple pages of original data are printed on a single sheet; an encryption selecting field 14b5 selected by a user whether or not to encrypt save data when the save data is uploaded and stored in the data saving server 5; and the like. The modes above are replacement printing modes.

As an example, in the first embodiment of the present invention, a user selects the black-and-white conversion print mode selecting field 14b2 and the encryption selecting field 14b5 on the replacement printing settings window 14b, and the replacement printing is performed in the black-and-white conversion print mode. In the second embodiment of the present invention to be described later, a user selects the detailed material omission mode selecting field 14b3 and the encryption selecting field 14b5 on the replacement printing settings window 14b, and the replacement printing is performed in the detailed material omission mode. In the third embodiment of the present invention, a user selects the N-up print mode selecting field 14b4 and the encryption selecting field 14b5 on the replacement printing settings window 14b, and the replacement printing is performed in the N-up print mode.

Referring back to FIG. 2, if the replacement printing selecting field 14a1 is not selected on the print settings window 14a displayed on the display unit 14 in Step S120 (Step S120; NO), it means that the user has selected normal printing in which original data is normally printed. Thus, the CPU 11 of the client computer 1 transmits the original data to the printing machine 3, and causes it to print the original data according to the print settings made on the print settings window 14a shown in FIG. 3 (Step S125). In other words, black-and-white object data of the original data, such as text, is printed black and white as it is, and color object data such as colored charts and photographs is printed in color.

On the other hand, if the replacement printing selecting field 14a1 is selected on the print settings window 14a displayed on the display unit 14, and if the black-and-white conversion print mode selecting field 14b2 is selected on the replacement printing settings window 14b in Step S120 (Step S120; YES), the data generation unit of the CPU 11 first searches for color object data in the original data generated by the application 131 (Step 130).

Next, when finding color object data in the original data, the data generation unit of the CPU 11 converts the color object data thus found into black-and-white object to be printed black and white and thereby generates black-and-white print data as print target data (Step S140).

Next, the save-data transmission unit of the CPU 11 uploads the original data containing the color object data, i.e., the color original data to the data saving server 5 (Step S150), and judges whether or not the uploading of the original data has been completed (has succeeded) (Step S160). Here, if the encryption selecting field 14b5 is selected on the replacement printing settings window 14b shown in FIG. 4, the save data is encrypted before being uploaded to and saved in the data saving server 5 in Step S150. Hence, to download the save data, entry of a password or the like is required.

FIG. 5 shows an example of an upload check window 14c displayed on the display unit 14 of the client computer 1 when original data (save data) is uploaded to the data saving server 5.

As shown in FIG. 5, the upload check window 14c has an upload selecting field 14c1 indicating, when selected, to "Upload save data to the data saving server," a route address display field 14c2 showing a route address of the data saving server 5, a user settings field 14c3; a subfolder creation rule setting field 14c4, and the like, and a user makes selections on them. Note that displaying the upload check window 14c is optional, and may be omitted in the first embodiment of the present invention.

FIG. 6 shows an example of an uploading window 14d displayed on the display unit 14 while the color original data (save data) is being uploaded to the data saving server 5.

As shown in FIG. 6, the uploading window 14d displays, for example, a message such as "Uploading save data to the data saving server," as well as an upload status bar 14d1 indicating the number of files uploaded and messages such as "1 file completed" when the uploading of the original data is completed (succeeded) in Step S160 shown in FIG. 2 (YES in S160).

When the uploading of the color original data (save data) to the data saving server 5 is completed (succeeded) (Step S160; YES), the save-data transmission unit of the CPU 11 acquires address information such as a URL indicating a save location of the color original data in the data saving server 5 (Step S170).

Next, the data print unit of the CPU 11 converts the acquired address information into an address information code such as a two-dimensional barcode (Step S180).

Then, the data print unit of the CPU 11 generates printing data by adding the address information code obtained by the conversion in Step S180 to the black-and-white print data (print target data) generated in Step S140 (Step S190), and causes the printing machine 3 to print the print data thus generated (S195).

FIG. 7 is a diagram schematically showing the replacement printing control method executed by the replacement printing control program according to the first embodiment of the present invention.

As shown in FIG. 7, in response to an instruction to perform replacement printing of color original data 101, the color original data is uploaded to the data saving server 5 as save data. Then, address information 105, such as https:// 192.168.1.1/xxx/1.prn, indicating a save location of the uploading is acquired, and is then converted to generate an address information code 107 such as a two-dimensional barcode.

On the other hand, when color object data 101a, such as a table or graph, is found in the color original data 101, the color object data 101a thus found is converted into an black-and-white object 103a to be printed black and white. Thereby, black-and-white print data 103 is generated as print target data.

Then, print data 109 is generated by adding the address information code 107 to the black-and-white print data 103 generated above, and is printed by the printing machine 3.

As described, the replacement printing control program according to the first embodiment of the present invention has: a data generation step of, in response to a request to perform replacement printing involving conversion of original data into black and white data, generating black-and-white data of the original data as print target data by converting color object data in the original data into black-and-white object data, and also generating the original data as save data; a save-data transmission step of transmitting the save data generated in the data generation step to a data saving server 5, and acquiring address information indicating a save location of the save data saved in the data saving server 5; and a data print step of converting the address information into an address information code having a better scanning recognition rate than the address information, generating print data by adding the address information code to the print target data, and causing a printing machine 3 to print the print data. Hence, irrespective of the data size, materials that meet demands can be provided with reduced costs of printing handouts.

Specifically, a handout preparer side can reduce costs of printing handouts by not performing color printing. On the other hand, although not being provided with color original data, a handout recipient side can certainly acquire the color original data from the data saving server 5 based on the address information printed on the handouts.

Even in a case, for instance, where a presentation, a seminar lecture, or the like is given using a projector for a number of color object data such as color-printed charts or photographs, handouts are printed black and white. Thus, the above-described program is effective for preparing handouts used in a seminar, a training seminar, or the like In addition, in the first embodiment of the present invention, the print settings window 14a is displayed, prompting a user to select either normal printing of printing original data as it is or replacement printing according to the embodiments of the present invention. Thus, the user can select one of the normal printing and the replacement printing when making print settings such as the number of copies to print.

Further, in the first embodiment of the present invention, the address information on the original data (save data) in the data saving server 5 is converted into the address information code such as a two-dimensional barcode having a better scanning recognition rate than the address information, and the address information code is printed on sheets. Thus, a handout recipient can certainly obtain the color original data from the data saving server 5 by acquiring the address information based on the address information code such as a two-dimensional barcode.

In addition, in the first embodiment, a user can select whether to encrypt the save data before transmitting and saving the save data to and in the data saving server 5. Thus, if the save data is highly confidential or should be restricted, the confidentiality or restriction of the save data can be improved by teaching a password to decrypt the save data only to specific people such as seminar participants who received the handouts, by for example printing the password at the last or the like of the handouts or on another sheet, or via email.

In the present invention, however, the save data does not necessarily have to be encrypted before being uploaded to and stored in the data saving server 5. If the save data is not encrypted, the encryption selecting field 14b5 of the replacement printing settings window 14b in FIG. 4 may be omitted. Moreover, it is optional in the present invention whether or not to display the replacement printing settings window 14b to prompt a user to select the replacement printing. The replacement printing mode may be selected on the print settings window 14a, or any one of the replacement printing modes may be fixedly determined.

Although it is described in the first embodiment of the present invention that the replacement printing control program 132a is included in the printer driver 132, the present invention is not limited to this. The replacement printing control program 132a may be stored in the HDD 13 as an application. The replacement printing control program 132a may be downloaded from a server (not shown) to the client computer 1 via the intranet 2 and the Internet 4 and stored in the HDD 13, or may be recorded in a recording medium such as a CD or a DVD, read by the client computer 1 from the recording medium, and stored in the HDD 13.

Moreover, the address information indicating a save location of save data in the data saving server 5 does not necessarily need to be converted into an address information code such as a two-dimensional barcode, and may be printed on a sheet as it is.

Additionally, in the flowchart shown in FIG. 2, if the uploading of the color original data (save data) to the data saving server 5 does not succeed, i.e., fails (Step S160; NO), the normal printing described above is performed (Step S125). Instead, the processing may return to Step S150 to repeat the uploading of the save data (Step S150) until the uploading of the save data is completed (succeeds) (Step S160; YES).

Embodiment 2

In the example described in the first embodiment of the present invention, the replacement printing is performed in the black-and-white conversion print mode. In an example to be described in the second embodiment of the present invention, the replacement printing is performed in the detailed material omission mode.

In the replacement printing control program described as an example in the first embodiment of the present invention, the black-and-white conversion print mode selecting field 14b2 is selected on the replacement printing setting window 14b shown in FIG. 4, and replacement printing in the black-and-white conversion print mode is performed, specifically, print data is generated by generating black-and-white data of original data through conversion of color object data in the original data into black-and-white data and then adding address information to the black-and-white data thus generated, and the original data is generated as save data.

In a replacement printing control program to be described as an example in the second embodiment of the present invention, the detailed material omission mode selecting field 14b3 is selected on the replacement printing setting window 14b shown in FIG. 4, and the replacement printing is performed in the detailed material omission mode. Specifically, the replacement printing control program generates outline data and detailed data from original data, generates print data by adding address information to the outline data, and generates the detailed data as save data. The second embodiment of the present invention has the same hardware configuration as the first embodiment of the present invention, and is therefore described with reference to the configuration diagram in FIG. 1.

Figure 8:
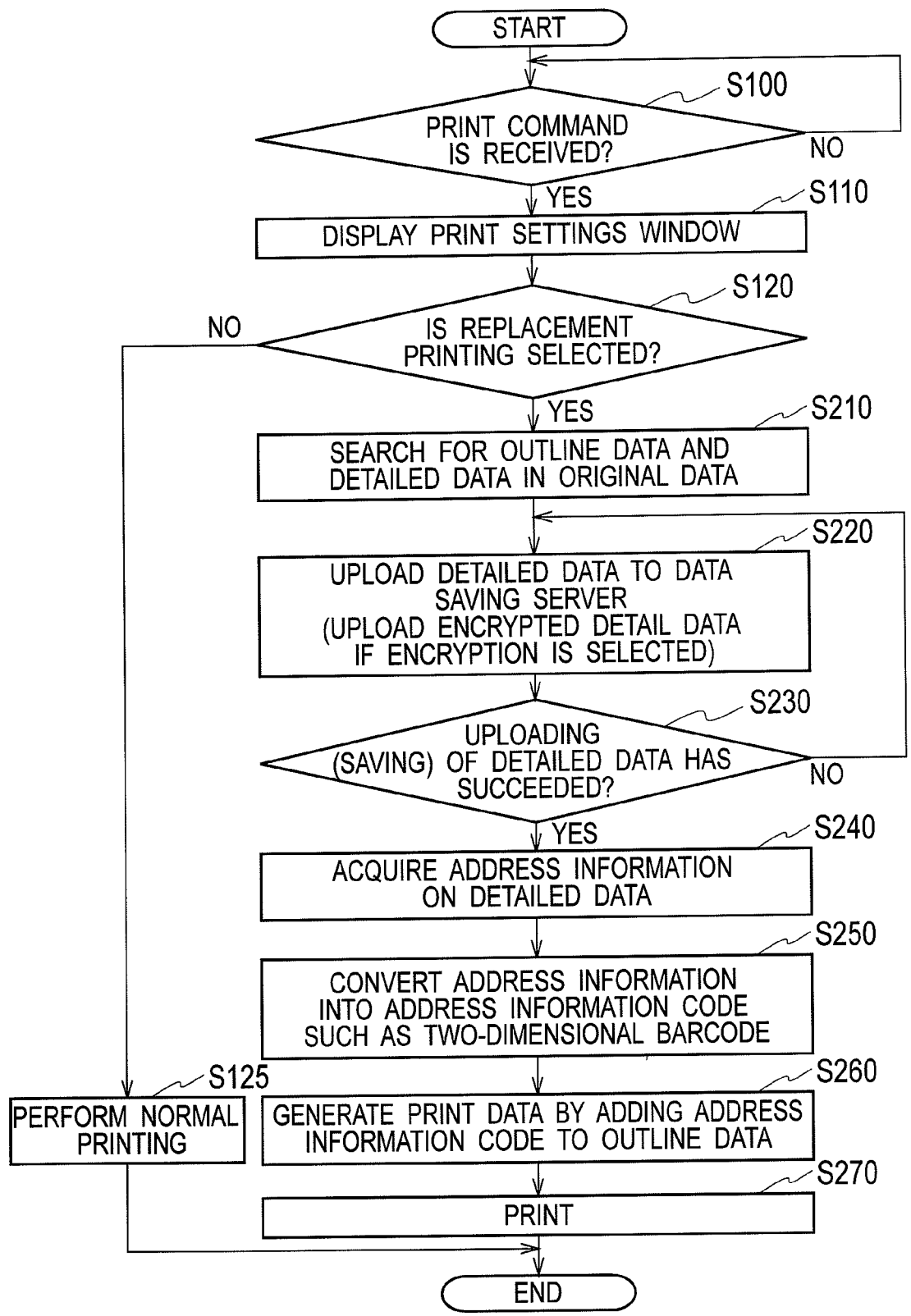
FIG. 8 is a flowchart showing a replacement printing control method executed by a replacement printing control program according to a second embodiment of the present invention.

FIG. 8 is a flowchart showing a replacement printing control method executed by a replacement printing control program according to the second embodiment of the present invention.

Processing steps which are the same as those in the flowchart shown in FIG. 2 showing the replacement printing control method executed by the replacement printing control grogram according to the first embodiment of the present invention are given the same step numbers and are not described again here. Only processing steps specific to the second embodiment of the present invention are described.

As shown in FIG. 8, if the replacement printing selecting field 14a1 is selected on the print settings window 14a displayed on the display unit 14 (Step S120; YES), the data generation unit of the CPU 11 first searches for outline data and detailed data in original data generated by the application 131 (Step S210).

Here, the outline data is data on a summary or an outline (abstract) appearing on the first page of a paper or the like, and detailed data is data on several pages or several tens of pages following the outline data. If the original data is a patent application publication, data on the front page where bibliographic items, the abstract of the invention, and the like are written is the outline data, and data on pages after the second page is the detailed data.

Next, once the data generation unit of the CPU 11 finds the outline data and the detailed data in the original data, the save-data transmission unit of the CPU 11 uploads the detailed data thus found to the data saving server 5 (Step S220) and judges whether the uploading of the detailed data to the data saving server 5 has been completed (has succeeded) or not (Step S230). If the encryption selecting field 14b5 is selected on the replacement printing settings window 14b shown in FIG. 4, the detailed data (save data) is encrypted before being uploaded to and saved in the data saving server 5 in Step S220. Thus, to download the detailed data, entry of a password or the like is required.

When the uploading of the detailed data (save data) to the data saving server 5 has been completed (has succeeded) (Step S230;YES), the save-data transmission unit of the CPU 11 acquires address information indicating a save location of the detailed data in the data saving server 5 (Step S240).

Then, the data print unit of the CPU 11 converts the acquired address information into an address information code such as a two-dimensional barcode (Step S250), generates print data by adding the address information code indicating the save location of the detailed data, to the outline data (Step S260), and causes the printing machine 3 to print the print data thus generated (Step S270).

If, on the other hand, the uploading of the detailed data (save data) to the data saving server 5 has not succeeded, i.e., has failed (Step S230; NO), the processing returns to Step S220 to repeat the detailed data uploading (Step S220) until it is completed (succeeds) (Step S230;YES). If the uploading of the detailed data to the data saving server 5 is failed (Step S230; NO), the outline data and the detailed data may be printed normally (Step S125), as it is for the first embodiment of the present invention shown in FIG. 3. Moreover, in the second embodiment of the present invention, as it is for the first embodiment of the present invention, the address information does not need to be converted into an address information code such as a two-dimensional barcode, and can be printed on sheets as it is.

Figure 9:
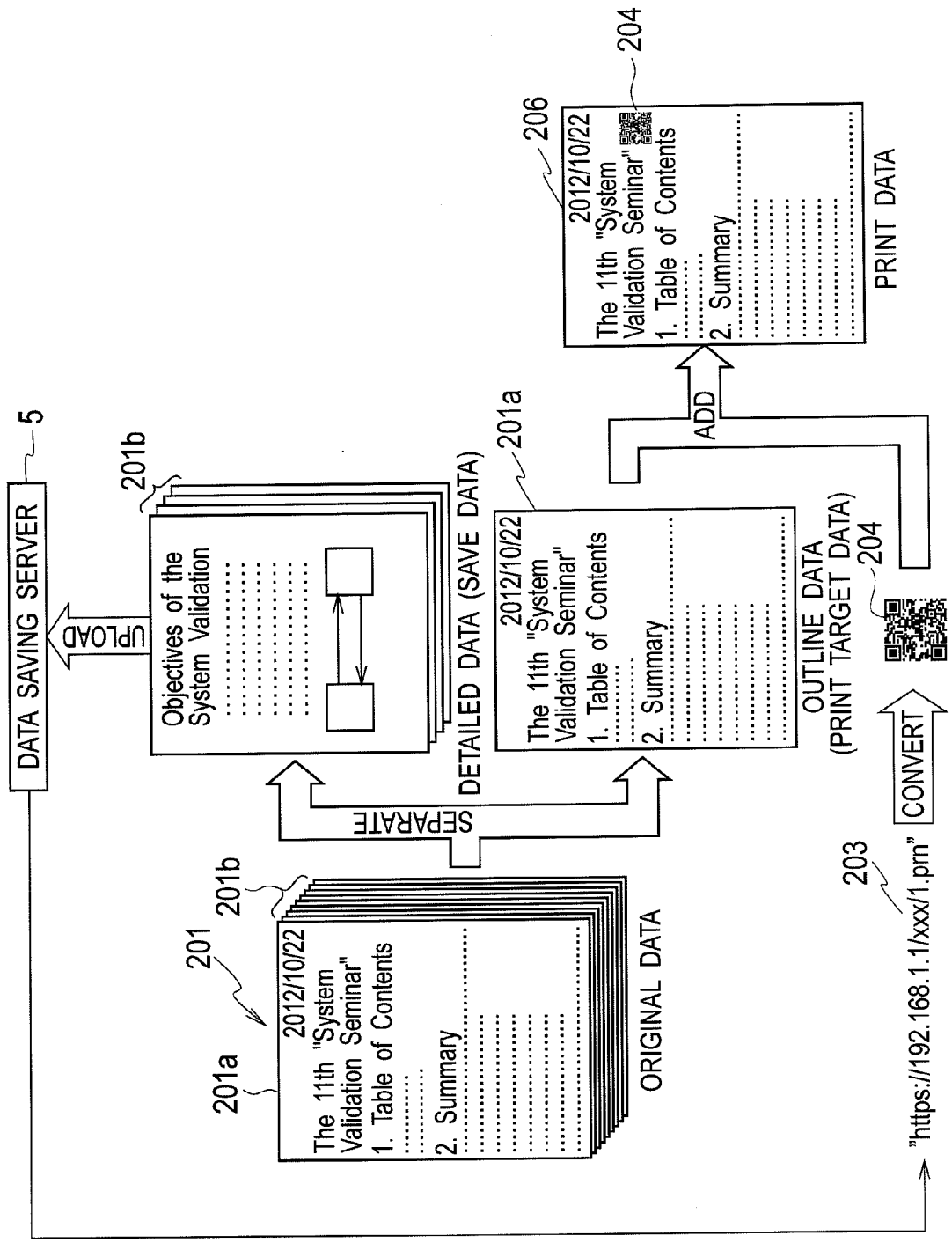
FIG. 9 is a diagram schematically showing the replacement printing control method executed by the replacement printing control program according to the second embodiment of the present invention.

FIG. 9 is a diagram schematically showing a replacement printing control method executed by the replacement printing control program according to the second embodiment of the present invention.

As shown in FIG. 9, in a case where replacement printing of original data 201 is instructed, detailed data 201b of the original data 201 is uploaded to the data saving server 5 as save data. Then, address information 203, such as https://192.168.1.1/xxx/1.prn, indicating a save location of the uploading is acquired, and is then converted to generate an address information code 204 such as a two-dimensional barcode.

On the other hand, when outline data 201a is found in the original data 201, the found outline data 201a is generated as print target data.

Then, the address information code 204 is added to the generated outline data 201a, and print data 206 is thereby generated, and is printed by the printing machine 3.

As described, the replacement printing control program according to the second embodiment of the present invention has: a data generation step of, in response to a request to perform replacement printing involving omission of details of original data, generating outline data as print target data and also detailed data as save data; a save-data transmission step of transmitting the save data generated in the data generation step to a data saving server 5, and acquiring address information indicating a save location of the save data saved in the data saving server 5; and a data print step of converting the address information into an address information code having a better scanning recognition rate than the address information, generating print data by adding the address information code to the print target data, and causing a printing machine 3 to print the print data. Hence, irrespective of the data size, materials that meet demands can be provided with reduced costs of printing handouts.

Specifically, a handout preparer side can reduce costs of printing handouts by not printing the detailed data having many pages but printing only the outline data having as few as one page or the like along with the address information code, such as a two-dimensional barcode, indicating the address information on the detailed data. On the other hand, although not being provided with printed detailed data, a handout recipient side can certainly acquire the detailed data later by downloading it from the data saving server 5. Hence, it is not inconvenient even if the detailed data is not printed on the handouts.

The replacement printing control program according to the second embodiment of the present invention is suitable for printing a summary of reports on academic research achievements. For example, only proceedings obtained by collecting pieces of outline data which are top pages of papers including research data from respective laboratories are printed, and meanwhile, the research data and contents of the paper from each laboratory are uploaded to the data saving server 5 as detailed data. Moreover, the replacement printing control program according to the second embodiment of the present invention is also suitable for printing flyers, catalogs, free papers or the like having many pages. For example, the top page where bargains and the like are shown is printed as outline data, and other pages following the top page are uploaded in the data saving server 5 as detailed data.

In the second embodiment of the present invention, data on the first page of a paper or the like is used as outline data, and data on several pages or several tens of pages following the outline data is used as detailed data. However, the present invention is not limited to this.

For example, the following measure may be taken. Specifically, suppose a case where "page unit" is selected in the document link unit selecting field 14*b*1 of the replacement printing settings window 14*b* shown in FIG. 4, and the number of pages is set to a certain value. Then, data on pages from the first page of a paper or the like to a page corresponding to the value set as the number of pages is used as the outline data, and data on several pages to more than several tens of pages following the outline data is used as detailed data.

Further, the outline data and the detailed data may be determined based on the contents of original data. Specifically, particular terms may be determined as original data creation rules in advance. Then, in original data, a page having a title such as "summary," "outline (abstract)," "introduction," "preface," "table of contents," and a page having a head shot may be determined as outline data. On the other hand, data on pages from a title such as "details," "outline" or the next page of the outline data, to the next outline data, as well as data on pages having a drawing, a table, or the like may be determined as detailed data.

Third Embodiment

Replacement printing in the black-and-white print mode and replacement printing in the detailed material omission mode are described in the first embodiment and the second embodiment of the present invention, respectively. In an example to be described in the third embodiment of the present invention, the N-up print mode selecting field 14*b*4 is selected on the replacement printing settings window 14*b*, and replacement printing is performed in the N-up printing mode. Like the second embodiment of the present invention, the third embodiment of the present invention has the same hardware configuration as the first embodiment of the present invention, and is therefore described with reference to the configuration diagram in FIG. 1.

Figure 10:
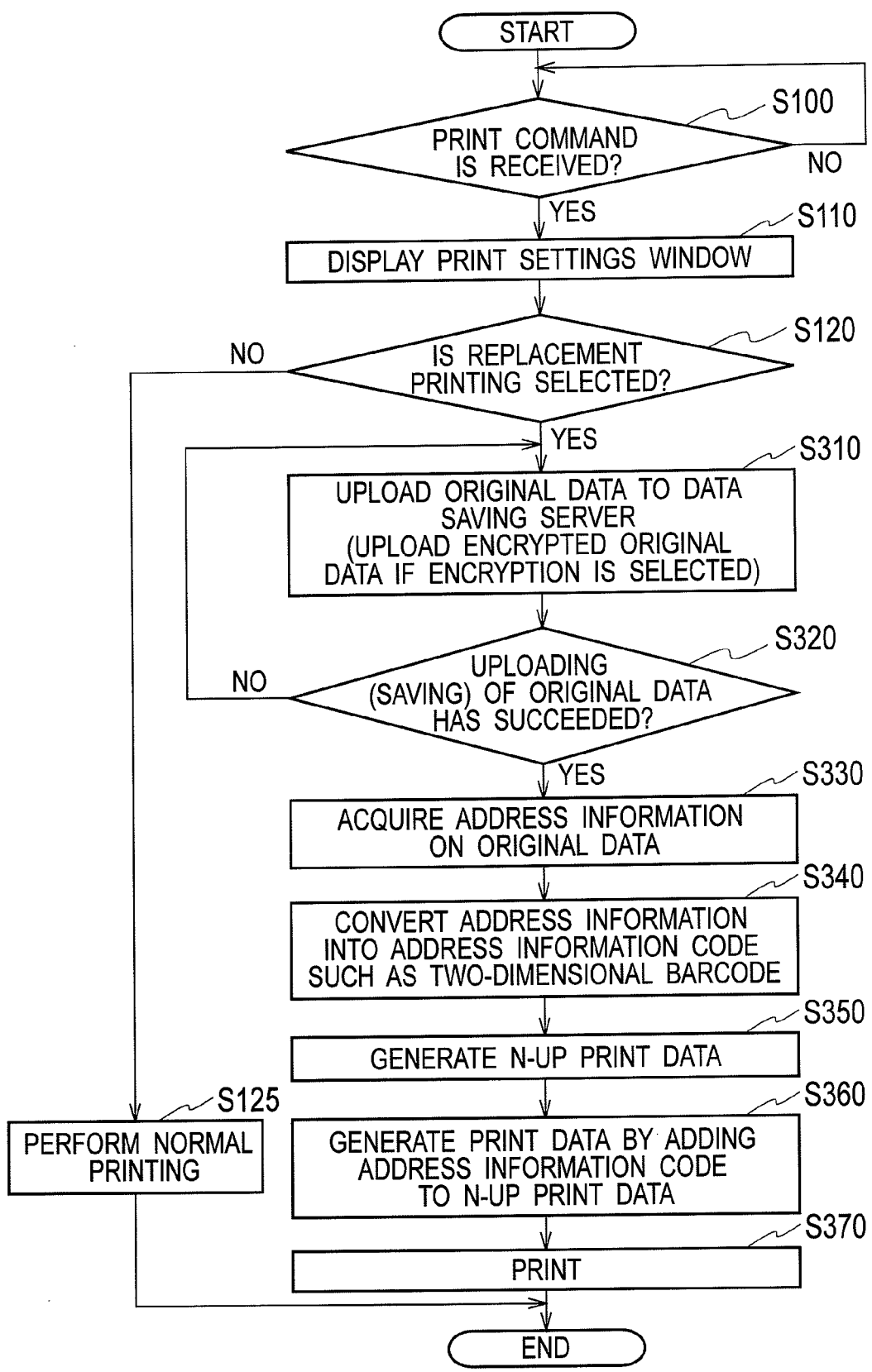
FIG. 10 is a flowchart showing a replacement printing control method executed by a replacement printing control program according to a third embodiment of the present invention.

FIG. 10 is a flowchart showing a replacement printing control method executed by a replacement printing control program according to the third embodiment of the present invention. Processing steps which are the same as those in the flowchart shown in FIG. 2 showing the replacement printing control method executed by the replacement printing control program according to the first embodiment of the present invention are given the same step numbers and are not described again here. Only processing steps specific to the third embodiment of the present invention are described.

As shown in FIG. 10, if the replacement printing selecting field 14*a*1 is selected on the print setting window 14*a* displayed on the display unit 14 (Step S120; YES), the save-data transmission unit of the CPU 11 of the client computer 1 uploads the entire original data generated by the application 131 to the data saving server 5 (Step S310), and judges whether or not the uploading of the entire original data to the data saving server 5 has been completed (has succeeded) (Step S320). If the encryption selecting field 14*b*5 is selected on the replacement printing settings window 14*b* shown in FIG. 4, the original data (save data) is encrypted before being uploaded to and saved in the data saving server 5 in Step S310. Thus, to download the original data, entry of a password or the like is required.

If it is judged in Step S320 that the uploading of the entire original data to the data saving server 5 has been completed (has succeeded) (Step S320; YES), the save-data transmission unit of the CPU 11 acquires address information indicating a save location of the original data in the data saving server 5 (Step S330).

Then, the data print unit of the CPU 11 converts the acquired address information into an address information code such as a two-dimensional barcode (Step S340).

Next, the data generation unit of the CPU 11 generates N-up print data (imposition data) as print target data by performing N-up printing processing (imposition processing), such as 4-up printing or 6-up printing, on each page data constituting the original data (Step S350).

Then, the data print unit of the CPU 11 generates print data by adding the address information code indicating the save location of the original data in the data saving server 5, to the last page or the like of the N-up printed pages (Step S360), and causes the printing machine 3 to print the print data thus generated (Step S370).

As described, the replacement printing control program according to the third embodiment of the present invention has: a data generation step of, in response to a request to perform replacement printing involving N-up (imposition) printing of original data, generating imposition data as print target data by performing imposition processing on the original data and also generating the original data as save data; a save-data transmission step of transmitting the save data to the data saving server 5, and acquiring address information indicating a save location of the save data saved in the data saving server 5; and a data print step of converting the address information into an address information code having a better scanning recognition rate than the address information, generating print data by adding the address information code to the print target data, and causing the printing machine 3 to print the print data. Hence, irrespective of the data size, materials that meet demands can be provided with reduced costs of printing handouts.

Specifically, a handout preparer side can reduce costs of printing handouts to 1/n or the like by not printing each single page of the original data on each single sheet but performing N-up printing (imposition printing) along with the address information code. On the other hand, a handout recipient side can certainly acquire the original data later by downloading it from the data saving server 5. Hence, it is not inconvenient even if the original data is N-up-printed on the handouts in small size.

Although the replacement printing control program 132*a* is provided in the printer driver 132 on the client computer 1 side in the first to third embodiments of the present invention, the present invention is not limited to this. For example, assume a case where original data is transmitted from the client computer 1 to the printing machine 3 which then stores the original data, and the printing machine 3 performs user authentication and gives instructions on printing the original data. In such a case, the replacement printing control program 132*a* similar to those of the first to third embodiment of the present invention may be stored in the HDD 33 of the printing machine 3 as an application, and the CPU 31 of the printing machine 3 may execute the replacement printing control program 132a as the client computer 1 of the first to third embodiment of the present invention does.

Fourth Embodiment

Next, the fourth embodiment of the present invention is described in detail with reference to the drawings.

In a fourth embodiment of the present invention, a description is given of a save-data reception control program for, downloading save data saved by execution of the replacement printing control programs according to first to third embodiments of the present invention, when a user receives a handout produced by the replacement printing of the printing machine 3, being the save data such as color original data (in the first embodiment), detailed data (in the second embodiment), or original data not N-up-printed (in the third embodiment), from the data saving server 5.

The fourth embodiment of the present invention has the same hardware configuration as the first embodiment of the present invention, and is therefore described with reference to the configuration diagram in FIG. 1.

As shown in FIG. 1, the printing machine 6 according to the fourth embodiment of the present invention has: a CPU 61 configured to control the overall operation of the printing machine 6, a memory 62 configured to store print data and the like, an HDD 63 storing, for example, programs executed by the CPU 61, a display unit 64 such as a liquid crystal monitor, an operation reception unit 65 provided with various buttons for operating the printing machine 6, a print execution unit 66 configured to convey a sheet according to various operational commands from the CPU 61 and perform various types of printing by reading, for example, a print job stored in the memory 62, a scanner unit 67, and a communication processing unit 68, such as a LAN interface unit, configured to connect the printing machine 6 to the Internet 4. Then, a save-data reception control program 631a according to the fourth embodiment of the present invention is stored in a printer driver 631 stored in the HDD 63. The save-data reception control program 631a may of course be stored in the HDD 63 not as the printer driver 631, but as an application.

Figure 11:
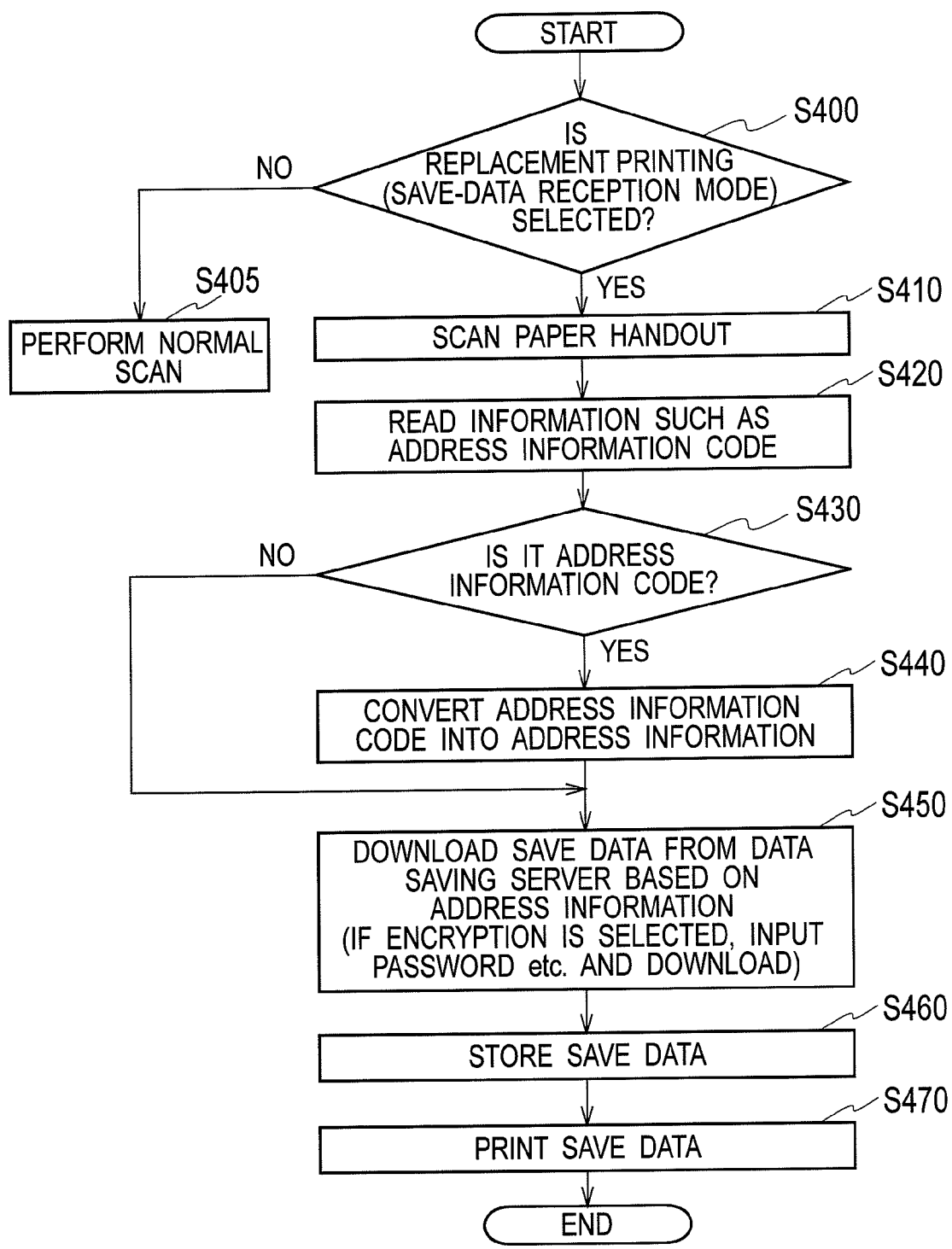
FIG. 11 is a flowchart showing a processing procedure of a save-data reception control method executed by a save-data reception control program according to a fourth embodiment of the present invention, the program being executed by a printing machine 6.

FIG. 11 is a flowchart showing a processing procedure of a save-data reception control method executed by the save-data reception control program according to the fourth embodiment of the present invention, the program being executed by the printing machine 6.

As shown in FIG. 11, the CPU 61 of the printing machine 6 judges whether or not a user has selected replacement printing (save-data reception mode) with the operation reception unit 65 (Step S400).

If it is judged in Step S400 that the replacement printing (save-data reception mode) is not selected (Step S400; NO), the printing machine 6 performs normal scan with the scanner unit 67 (Step S405).

If, on the other hand, it is judged in Step S400 that the replacement printing has been selected with the operation reception unit 65 (Step S400; YES), the printing machine 6 causes the scanner unit 67 to scan a paper handout on which an address information code, such as a two-dimensional code, or address information is printed (Step S410), and recognizes specific information, such as the address information code or the address information, on the paper handouts (Step S420).

Then, if the specific information thus recognized is an address information code such as a two-dimensional barcode (Step S430; YES), the printing machine 6 converts the address information code into address information (Step S440).

The processing in Steps S400 and S405 may be omitted to execute replacement printing (save-data reception mode) irrespective of the setting made by a user.

Next, based on the address information acquired from the paper handout, the CPU 61 of the printing machine 6 accesses the data saving server 5 via the Internet 4, and downloads the save data stored in the save data server 5 at a save location indicated by the address information (Step S450), and stores the save data in the memory 62 or the HDD 63 (Step S460).

Then, the CPU 61 of the printing machine 6 prints the save data stored in the HDD 63 (Step S470). If the save data saved in the data saving server 5 is encrypted, a password or the like needs to be entered for the downloading in Step S450, the password being printed on the handout or another sheet, or provided via email or the like. In addition, the printing machine 6 is also capable of storing save data without printing it.

For example, assume a case where the scanner unit 67 of the printing machine 6 scans a print on which the print data 109 shown in FIG. 7 is replacement-printed by the replacement printing control program according to the first embodiment of the present invention or the like. In this case, the CPU 61 reads the address information code 107 from the print on which the print data 109 is printed, and converts the address information code 107 into the address information 105 such as a URL.

Then, the CPU 61 of the printing machine 6 accesses the data saving server 5 via the Internet 4 based on that address information 105, downloads the color original data (save data) which is not printed on the handout, and causes the print execution unit 66 to print the color original data.

Assume a case where the scanner unit 67 of the printing machine 6 scans a print on which the one-page-long print data 206 shown in FIG. 9 is replacement-printed by the replacement printing control program according to the second embodiment of the present invention or the like. In this case, the CPU 61 of the printing machine 6 reads the address information code 204 and converts the address information code 204 into the address information 203 such as a URL.

Then, the CPU 61 accesses the data saving server 5 based on the address information 203, downloads the detailed data 201b not printed on the handout, and if necessary, causes the print execution unit 66 to print the detailed data 201b.

Further, in a case where the scanner unit 67 of the printing machine 6 scans an address information code on a handout on which original data is N-up-printed by the replacement printing control program according to the third embodiment of the present invention or the like, the CPU 61 can access the data saving server 5 based on the address information code and download the original data which is not being N-up-printed.

As described, according to the save-data reception control program according to the fourth embodiment of the present invention, when a handout recipient receives a handout on which an address information code, such as a two-dimensional barcode, or address information itself has been printed by the replacement printing control program according to any of the first to third embodiments of the present invention, the recipient can acquire the address information by scanning the received handout and download save data such as color original data, detailed data, or original data which is not N-up-printed.

In the first to fourth embodiments of the present invention, the data saving server 5 is provided on the Internet 4. However, the printing machine 6 or the like may be given a function as the data saving server 5.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A non-transitory computer-readable storage medium storing a program for causing a computer to execute a process, the process comprising:
   a data generation step of, in response to a command to perform replacement printing of original data, generating, based on the original data, print target data to be printed on a sheet and save data based on the original data to be transmitted to a data saving server connected via a network, wherein the print target data is different from the original data and the save data is different from the print target data;
   a save-data transmission step of transmitting the save data generated in the data generation step to the data saving server, and acquiring address information including a barcode and indicating a save location of the save data saved in the data saving server; and
   a data print step of generating print data by adding the address information including the barcode acquired in the save-data transmission step to the print target data and driving a printing machine to print the print data as generated to generate a handout,
   wherein the save data saved in the data saving server is accessible by using the address information including the barcode printed on the handout, and
   wherein replacement printing includes the data generation step, the save-data transmission step, and the data print step.

2. The non-transitory computer-readable storage medium according to claim 1, wherein
   the original data contains color object data, and
   the data generation step comprises, if the command to perform the replacement printing includes black-and-white conversion of the original data, generating, as the print target data, black-and-white data of the original data by performing black-and-white conversion on the color object data, and generating the original data as the save data.

3. The non-transitory computer-readable storage medium according to claim 1, wherein
   the original data contains detailed data indicating details and outline data indicating an outline of the detailed data, and
   the data generation step comprises, if the command to perform the replacement printing includes omission of details of the original data, generating the outline data of the original data as the print target data and generating the detailed data of the original data as the save data.

4. The non-transitory computer-readable storage medium according to claim 1, wherein the data generation step comprises, if the command to perform the replacement printing includes imposition of the original data, generating imposition data as the print target data by performing imposition processing on the original data and generating the original data as the save data.

5. A replacement printing control apparatus comprising:
   a processor;
   a computer-readable storage medium storing a program executed by the processor;
   a data generation unit implemented when the processor executes the program and configured to, in response to a command to perform replacement printing of original data, generate, based on the original data, print target data to be printed on a sheet and save data based on the original data to be transmitted to a data saving server connected via a network, wherein the print target data is different from the original data and the save data is different from the print target data;
   a save-data transmission unit implemented when the processor executes the program and configured to transmit the save data generated by the data generation unit to the data saving server and to acquire address information including a barcode and indicating a save location of the save data saved in the data saving server; and
   a data print unit implemented when the processor executes the program and configured to generate print data by adding the address information including the barcode acquired by the save-data transmission unit to the print target data and to drive a printing machine to print the print data as generated to generate a handout,
   wherein the save data saved in the data saving server is accessible by using the address information including the barcode printed on the handout, and
   wherein replacement printing includes the data generation step, the save-data transmission step, and the data print step.

6. A replacement printing control method comprising:
   a data generation step of, by a processor, in response to a command to perform replacement printing of original data, generating, based on the original data, print target data to be printed on a sheet and save data based on the original data to be transmitted to a data saving server connected via a network, wherein the print target data is different from the original data and the save data is different from the print target data;
   a save-data transmission step of, by the processor, transmitting the save data generated in the data generation step to the data saving server, and acquiring address information including a barcode and indicating a save location of the save data saved in the data saving server; and
   a data print step of, by the processor, generating print data by adding the address information including the barcode acquired in the save-data transmission step to the print target data and driving a printing machine to print the print data as generated to generate a handout,
   wherein the save data saved in the data saving server is accessible by using the address information including the barcode printed on the handout, and
   wherein replacement printing includes the data generation step, the save-data transmission step, and the data print step.

* * * * *